United States Patent
Balaz

(10) Patent No.: US 9,810,009 B2
(45) Date of Patent: Nov. 7, 2017

(54) MECHANISM FOR MOUNTING OF A HINGED CAR DOOR

(71) Applicant: Premysl Balaz, Mlada Boleslav (CZ)

(72) Inventor: Premysl Balaz, Mlada Boleslav (CZ)

( * ) Notice: Subject to any disclaimer, the term of this patent is extended or adjusted under 35 U.S.C. 154(b) by 0 days.

(21) Appl. No.: 15/024,323

(22) PCT Filed: Jul. 30, 2014

(86) PCT No.: PCT/CZ2014/000086
§ 371 (c)(1),
(2) Date: Mar. 23, 2016

(87) PCT Pub. No.: WO2015/043555
PCT Pub. Date: Apr. 2, 2015

(65) Prior Publication Data
US 2016/0237727 A1    Aug. 18, 2016

(30) Foreign Application Priority Data
Sep. 26, 2013 (CZ) ..................... 2013-742

(51) Int. Cl.
*E05D 1/04* (2006.01)
*E05F 1/12* (2006.01)
(Continued)

(52) U.S. Cl.
CPC .............. *E05D 1/04* (2013.01); *B60J 5/0472* (2013.01); *E05D 3/10* (2013.01); *E05D 11/1007* (2013.01);
(Continued)

(58) Field of Classification Search
CPC ......... E05D 1/04; E05D 3/10; E05D 11/1007; E05D 11/1085; E05F 1/12; E05F 1/1292;
(Continued)

(56) References Cited

U.S. PATENT DOCUMENTS 6,425,205 B2 *    7/2002   Wygle .................. E05F 15/619
                                                                    296/56
7,100,245 B2 *    9/2006   Wohlfarth ................. E05D 3/10
                                                                    16/367
(Continued)

FOREIGN PATENT DOCUMENTS

DE      202005013033 U1    3/2006

OTHER PUBLICATIONS

International Search Report in Corresponding PCT/CZ2014/000086 dated Oct. 23, 2014 (4 pages).
(Continued)

*Primary Examiner* — Joseph D Pape
*Assistant Examiner* — Dana Ivey
(74) *Attorney, Agent, or Firm* — Hovey Williams LLP

(57) ABSTRACT

A mechanism for mounting of a hinged car door, comprising a stabilizing frame (1) attached to a vehicle frame (15). The stabilizing frame (1) is equipped, in its lower part, with a lock (6) for stabilizing a bracket (3) of a door (14) and, in its upper part, the stabilizing frame (1) is equipped with a toothed pinion (5) and at least one guiding roller (4), whereas a toothed arm (2) is arranged between the toothed pinion (5) and the guiding roller (4), and the bracket (3) of the door (14) is swing attached to the toothed arm (2), whereas the door (14) is attached to the bracket (3) of the door (14) by means of pins (13) of the door (14).

7 Claims, 3 Drawing Sheets

(51) Int. Cl.
    *E05D 11/10*     (2006.01)
    *B60J 5/04*      (2006.01)
    *E05D 3/10*      (2006.01)

(52) U.S. Cl.
    CPC ............ *E05D 11/1085* (2013.01); *E05F 1/12* (2013.01); *E05F 1/1215* (2013.01); *E05F 1/1292* (2013.01); *E05Y 2201/722* (2013.01); *E05Y 2800/266* (2013.01); *E05Y 2900/531* (2013.01)

(58) Field of Classification Search
    CPC ............ E05F 1/1215; E05Y 2201/722; E05Y 2800/266; E05Y 2900/531; B60J 5/0472
    USPC .................................................. 296/146.11
    See application file for complete search history.

(56) References Cited

U.S. PATENT DOCUMENTS

| | | |
|---|---|---|
| 7,396,068 B1 | 7/2008 | McRobert |
| 2001/0054257 A1 | 12/2001 | Wygle et al. |
| 2009/0295187 A1 | 12/2009 | Ham |

OTHER PUBLICATIONS

Written Opinion of the International Searching Authority in Corresponding PCT/CZ2014/000086 dated Apr. 2, 2015 (7 pages).
International Preliminary Report on Patentability in Corresponding PCT/CZ2014/000086 dated Sep. 9, 2015 (11 pages).

\* cited by examiner

MECHANISM FOR MOUNTING OF A HINGED CAR DOOR

This is a national stage application under 35 U.S.C. §371 of International Application PCT/CZ2014/000086 filed Jul. 30, 2014, which claims the benefit of Czech Republic application Serial No. PV2013-742 filed Sep. 26, 2013, the entire disclosures of which are incorporated herein by reference.

TECHNICAL FIELD

The invention relates to a mechanism for mounting of a hinged car door usable especially for a structure of large-area entrance door systems enabling exiting a car and getting into a car also in a confined parking space.

BACKGROUND ART

Presently, the solution is known for moving a car door in a vertical plane in case of sport vehicles, in which the method for car entrance door moving is utilized, for example according to the patent DE 202005013033. Upwards door moving is carried out by first slight, several-degree opening the door attached to one swivel; the door strikes a doorstop and will be vertically turned upwards by about 60° by means of a second swivel placed on a revolving arm end with contribution of compression springs.

A disadvantage of the known solution is a necessity to use the vertical door opening also in case of sufficient free space beside the vehicle. The door must be always open vertically, which requires a less natural move than mere pushing the door to the side. Also the exit opening is not entirely freed. The door opening angle is not great, only 60°. It is necessary to take into account some limitation of an upper section of the door exiting space, because its part is covered by the risen door. One-point pivot attachment of the door is subject to heavy strain. Therefore, this solution is relatively expensive, with high demands on material for individual elements and production accuracy. All of this is reflected in a price of the whole mechanism.

Document US2001/054257A1 discloses a power operating system for opening and closing a vehicle liftgate having a pair of drive units supported on the vehicle roof and connected to the liftgate for opening and closing the liftgate. Each drive unit includes a housing having a curved track and a curved gear rack that is bodily movable endwise in the housing and guided by the curved track, the rack also serving as the drive link between the housing and the liftgate. The combined rack and drive link is extended and retracted by a pinion gear that is journalled interiorly in the housing and engages the teeth of the curved gear rack. The pinion gear is rotated by the output shaft of the motor, which in turn is fastened to the side of the housing. The motor is a reversible electric motor and is adapted to be operably coupled to the vehicle ECU unit and preferably includes an internal transmission and electrically operated clutch controlled by the ECU unit.

Document US2009/295187A1 discloses an improved vehicle door hinge which allows a door to swing open in a horizontal plane in order to clear the vehicle frame, this rotation is accomplished by a hinge. A curved rail mounted on the door then allows the hinge portion to move upward, the curvature of the rail allowing a small amount of motion of the rail to cause a twist of the door as it moves, and the twist causes the door to move clear of the doorway of the vehicle frame. The rail comprises roller races on each edge, the rail races have running on them a set of four rollers, two rollers on each edge of the rail. The hinge is located on one end of the rail.

Document U.S. Pat. No. 7,396,068B1 discloses an apparatus for attaching a door to a passenger vehicle body having a lift arm and a hinge assembly. The lift arm rotatably connects the door to the vehicle body. The lift arm imparts upward rotational movement to the door relative to the vehicle body as upward pressure is applied to the arm. The hinge assembly allows the door to open horizontally about a pair of hinges connected to the hinge assembly. A stop pin assembly dictates whether the door can be opened vertically or horizontally.

DISCLOSURE OF INVENTION

Aforesaid disadvantages are in substantial extent eliminated by the mechanism for mounting of a hinged car door that comprises a stabilizing frame attached to a vehicle frame, according to the invention, a principle of which lies in the fact that the stabilizing frame is equipped, in its lower part, with a lock for stabilizing a bracket of a door and, in its upper part, the stabilizing frame is equipped with a toothed pinion and at least one guiding roller. A toothed arm is arranged between the toothed pinion and the guiding roller. The bracket of the door is swing attached to the toothed arm: The door is attached to the bracket of the door by means of pins of the door.

The mechanism according to the invention has the advantage that it allows to open and close the car door both by a common method, i.e. pushing to the side in a place having a sufficient space for getting into/out of a car, and by upward moving in a confined park space.

The mechanism according to the invention is possible to install both in basic production and additionally as an aftermarket part onto older cars. Most of current cars have adequate space for fitting this mechanism.

It is advantageous if the toothed arm is interconnected with the door bracket in two points. First of these points is the door bracket swivel and the second one is an expandable brace pivoted with its one end on the toothed arm and with the other end on the door bracket.

It is also advantageous if the toothed arm is provided with a stop for terminating a path of the door vertical sliding out in the first phase of rising and also for controlling the bracket's unlocking pin which is taken out form a connecting hole that allows a continuation of the door vertical sliding out second phase.

Another advantage is if the door bracket contains the bracket's unlocking pin, which allows, after disconnecting, the second phase of the highest door sliding out in the vertical plane.

Next, it is suitable if the toothed arm is provided with a connecting hole into which the door bracket's unlocking pin will sink before the last phase of a vertical sliding out. The toothed arm is further provided with two arresting openings for arresting pin.

It is also suitable if the stabilizing frame is provided with an arresting pin of the toothed arm, the task of which is to lock the toothed arm in the two limit positions when the door is moved vertically. Operating of the arresting pin can be carried out for example by means of an electromagnetic control.

Further, it is suitable if the door bracket contains an arresting pin for the door position, which makes the door immovable during the whole phase of vertical sliding out when the pin is inserted in an arresting door hinge so as the door is immobilized in relation to its bracket.

Next, it is suitable if the toothed pinion engaged to the toothed arm is spring preloaded in relation to the toothed arm so as to provide a driver with a help during the door upward sliding out in the first phase of the door rise.

Further, it is advantageous if the expandable brace is an electric one or is filled with pressure gas, so as to provide a driver with help during the door upward sliding out in the second and final phase of the door rise.

BRIEF DESCRIPTION OF DRAWINGS

An example of an embodiment of the mechanism for mounting the hinged car door according to the invention is illustrated on an attached drawing, where.

DESCRIPTION OF PREFERRED EMBODIMENTS

Figure 1:
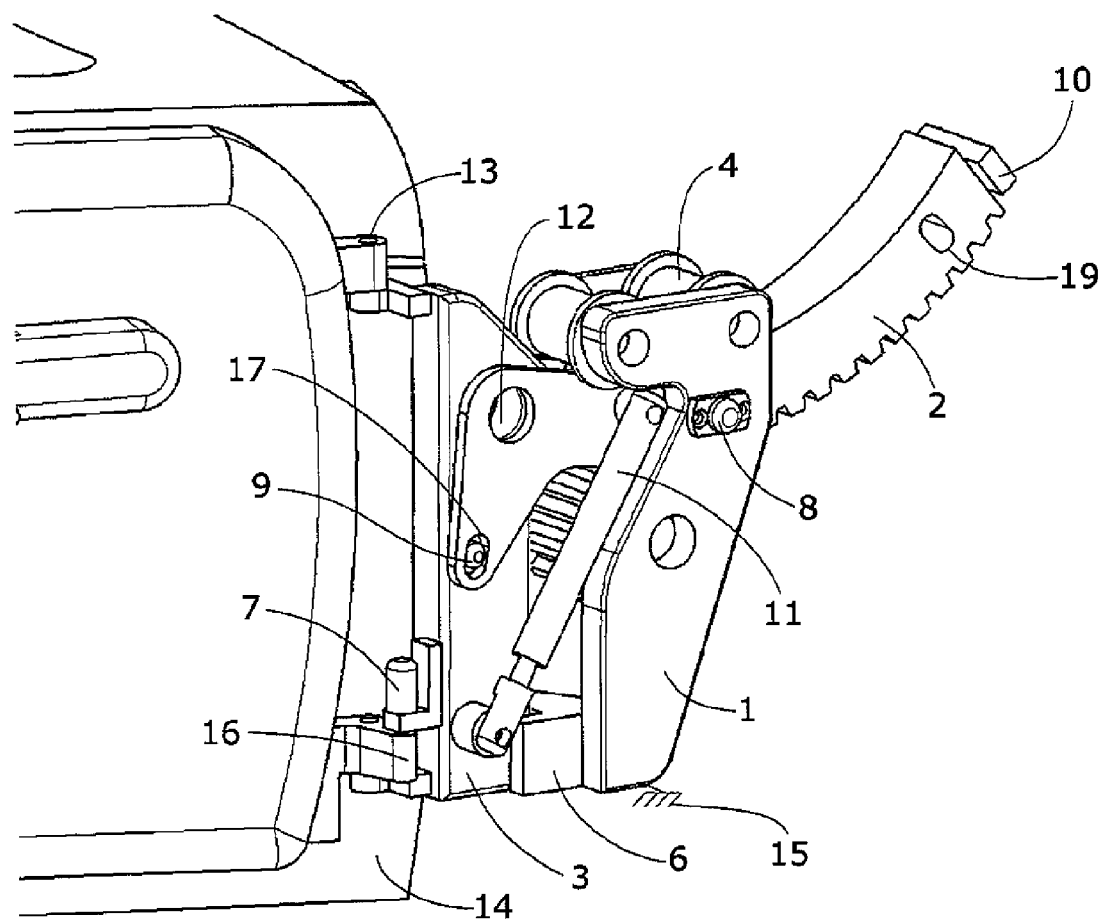
FIG. 1 represents a schematic view of the mechanism in position with closed door or slightly open door in the first phase, before its moving out in vertical direction.

The mechanism for mounting the hinged car door according to FIG. 1 comprises a stabilizing frame 1 attached to the car frame 15. On the lower part of the stabilizing frame 1 a U-lock 6 is arranged, for receiving a bracket 3 of the door 14 when the door 14 is in its lower position. Next, a toothed pinion 5 is mounted on the stabilizing frame 1 with double guiding rollers 4 above the toothed pinion 5. Between the toothed pinion 5 and guiding rollers 4 a toothed arm 2 is inserted, which is in common gearing with the toothed pinion 5 and rolls on the guiding rollers 4.

On the toothed arm 2, an expandable gas brace 11 is pivoted, which is, by its second end, pivoted in the bracket 3 of the door 14. The bracket 3 of the door 14 is swing attached to the toothed arm 2 by means of a swivel pin 12 and equipped with pins 13 of the door 14, an unlocking pin 9 of the bracket 3, and an arresting pin 7 for the door 14 position. The toothed arm 2 is equipped with a stop 10 and a connecting hole 17 for inserting the unlocking pin 9 of the bracket 3. The toothed arm 2 is further equipped with arresting openings 18, 19 for inserting an arresting pin 8 for locking the toothed arm 2. The arresting pin 8 is movable transversally trough the stabilizing frame 1. The stabilizing frame 1 is further equipped with a lock 6. The door 14 is equipped with an arresting hinge 16 of the door 14.

So, the toothed arm 2 is interconnected with the bracket 3 of the door 14 in two points, where one point is the swivel pin 12 of the bracket 3 of the door 14 and the second point is the expandable brace 11.

The toothed pinion 5 is spring preloaded in relation to the arm 2.

The above mentioned mechanism has the following function: In case that a driver parks a car in a park place with sufficient space for opening the door at getting off, then he/she opens the door 14 by means of a not depicted lever, pushes the door 14 horizontally to open it by about 15° and then, by a next pushing, opens the door 14 by further about 55° and can easily get out as with most ordinarily designed car doors. Opening the door 14 in horizontal direction has the value of about 70°.

In case of town parking, when the space for opening the long door 14 is not sufficient, the driver once again opens the door 14 by means of a not shown lever, pushes the door 14 horizontally so as to open it by about 15°, and after detection of a resistance in this angle, a not depicted diode will go on, which indicates that the door 14 is in a correct position for rising. In this moment, after pressing a not depicted button, the arresting pin 7 of the door 14 is locked, so as the arresting hinge 16 of the door 14 will be made immovable in relation to the bracket 3 of the door 14.

The stabilizing frame 1 is firmly attached to the car frame 15 in two points. The stabilizing frame 1 is equipped with the U-lock 6, into which, in position shown in FIG. 1, the bracket 3 of the door 14 sits down. So, during a ride, the door 14 is well stabilized against the car movement by fixing the bracket 3 of the door 14 in the lock 6, which is the first point of fixation. The second point of fixation is situated in upper part of the bracket 3 of the door 14, namely by placing on the swivel pin 12 of the bracket 3, which is pivoted in the toothed arm 2.

Figure 2:
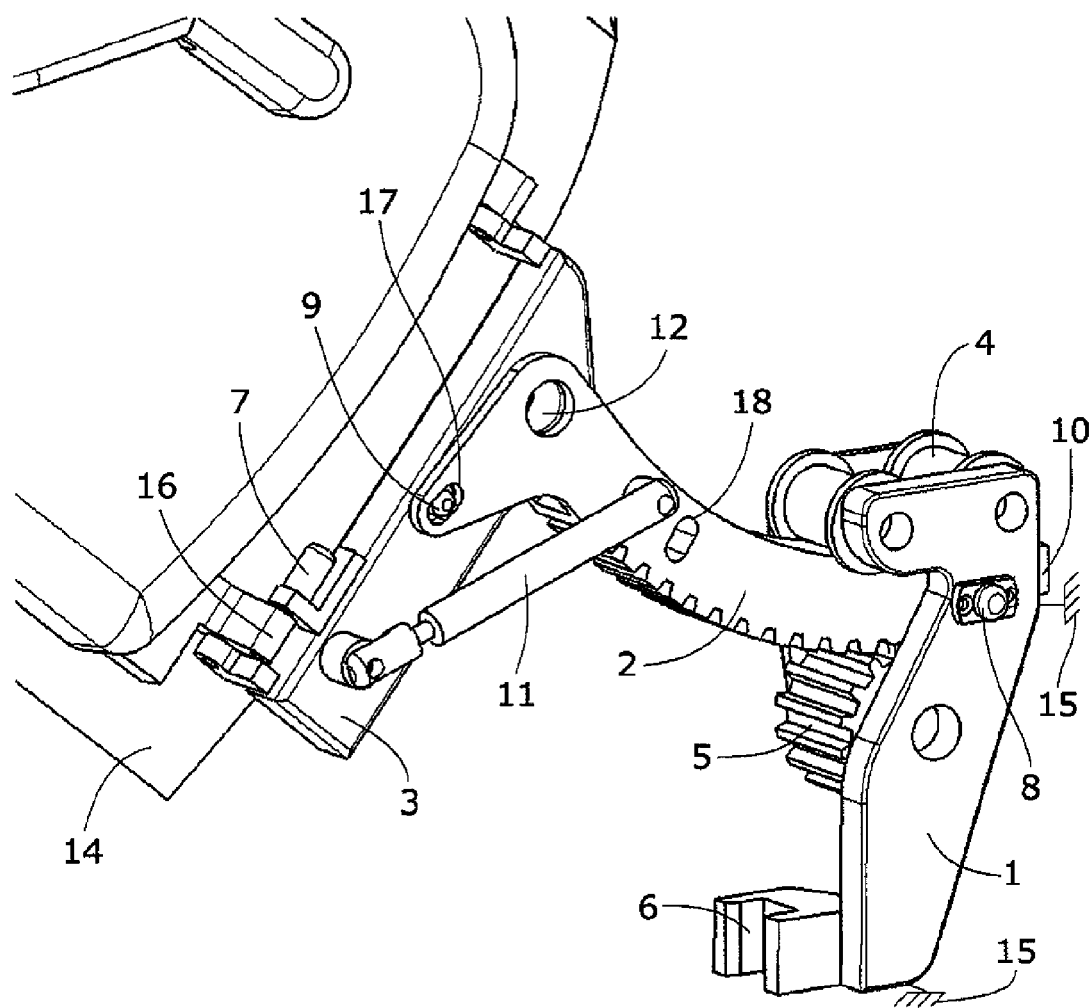
FIG. 2 represents a schematic view of the mechanism in position with the door moved vertically, by about 40° in the second phase.

The toothed arm 2 is guided between guiding rollers 4 sitting down on the toothed arm 2 from above and the toothed pinion 5 being in contact with toothing on the toothed arm's lower side 2. After clicking, which informs the driver of the possibility to vertically raise the door 14, the toothed arm 2 is automatically unlocked by removing the arresting pin 8 from the first arresting opening 18 of the toothed arm 2. The first phase of the door movement in a confined space starts by this process (see FIG. 2).

After it, the driver develops some vertical force for raising the door 14. This operation is supported by the spring preloaded toothed pinion 5. Spring preloading of the pinion 5 is accomplished so as the pinion 5 will be helping at extending the toothed arm 2 carrying the door 14 upwards. The door 14 will be vertically lifted by about 40°.

Figure 3:
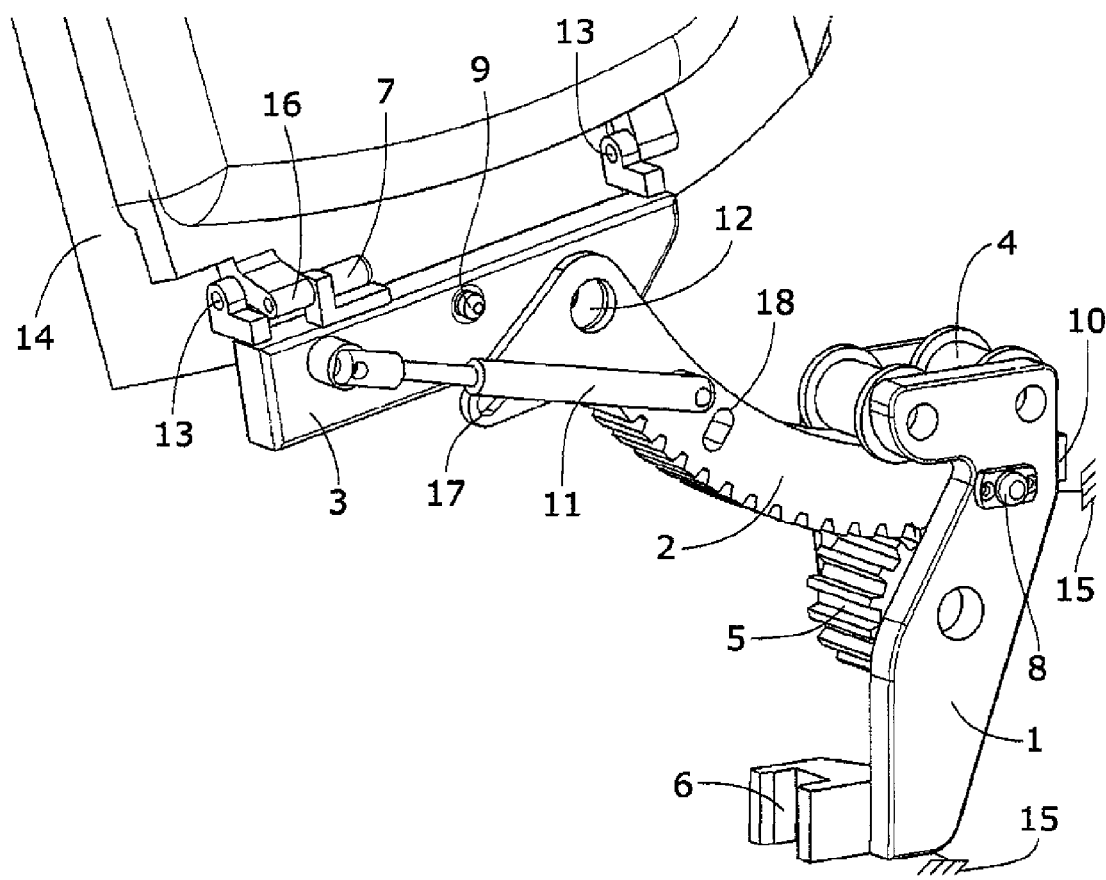
FIG. 3 represents a schematic view of the mechanism in position with the door moved in horizontal direction, before reaching about 80° angle in the third phase, which allows both getting out of the car and getting into the car.

After this lifting, the stop 10 of the toothed arm 2 will switch on an electromagnet of arresting pin 8 and the arresting pin 8 will penetrate the second arresting opening 19 and interconnect the toothed arm 2 with the stabilizing frame 1. At the same time, another electromagnet will release the unlocking pin 9 of the bracket 3, which will free the bracket 3 of the door 14 from the interconnection with the toothed arm 2 by removing the unlocking pin 9 from the connecting hole 17 (see FIG. 3). So, the second phase of the door movement starts.

Now another raising the door 14 by other approx. 40° is possible using the driver's force, which is assisted by the expandable brace 11 preloaded with pressure gas. After sliding out, the expandable brace 11 holds the door 14 in the highest position, moved to the vertical angle of about 80°. So, the second phase of the door moving is finished.

Closing the door after getting out of the car takes place in opposite sequence of operations. Opening the door is of course possible to accomplish by the described way also when getting into the car.

INDUSTRIAL APPLICABILITY

The solution is useful to utilize in automotive industry sector, in enterprises engaged in production parts for cars.

The invention claimed is:

1. A mechanism for mounting of a hinged car door, comprising a stabilizing frame (1) attached to a vehicle frame (15), wherein the stabilizing frame (1) is equipped, in its lower part, with a U-lock (6) for receiving a bracket (3) of the hinged car door (14) when the hinged car door (14) is in its lower position and, in its upper part, the stabilizing frame (1) is equipped with a toothed pinion (5) and at least one guiding roller (4), wherein a toothed arm (2) is arranged between the toothed pinion (5) and the guiding roller (4), and the bracket (3) of the hinged car door (14) is swing attached to the toothed arm (2), wherein the hinged car door (14) is attached to the bracket (3) of the hinged car door (14) by means of pins (13) of the hinged car door (14), and further wherein the toothed arm (2) is interconnected with the bracket (3) of the hinged car door (14) in two points, where one point is a swivel pin (12) of the bracket (3) of the hinged car door (14) and the second point is an expandable brace (11), which is, with its first end, pivoted on the toothed arm (2) and, with its second end, pivoted on the bracket (3) of the hinged car door (14).

2. The mechanism according to claim 1, wherein the bracket (3) of the hinged car door (14) comprises an unlocking pin (9) of the bracket (3).

3. The mechanism according to claim 2, wherein the toothed arm (2) is equipped with a connecting hole (17) for insertion of the unlocking pin (9) of the bracket (3) and with locking openings (18, 19) for insertion of an arresting pin (8) of the toothed arm (2).

4. The mechanism according to claim 3, wherein the arresting pin (8) of the toothed arm (2) is attached to the stabilizing frame (1).

5. The mechanism according to claim 1, wherein the bracket (3) of the hinged car door (14) comprises an arresting pin (7) for the hinged car door (14), and the hinged car door (14) is provided with an arresting hinge (16) of the hinged car door (14).

6. The mechanism according to claim 1, wherein the toothed pinion (5) is spring preloaded in relation to the toothed arm (2).

7. The mechanism according to claim 1, wherein the expandable brace (11) is a pneumatic brace or an electric brace.

* * * * *